Sept. 20, 1966     M. S. PITTLER ET AL     3,274,456

RECTIFIER ASSEMBLY AND METHOD OF MAKING SAME

Filed Nov. 21, 1962

INVENTORS
MARVIN S. PITTLER
JOHNWAY CHU
BY James and Franklin
ATTORNEYS

United States Patent Office 3,274,456
Patented Sept. 20, 1966

3,274,456
RECTIFIER ASSEMBLY AND METHOD OF MAKING SAME
Marvin S. Pittler and Johnway Chu, Teaneck, N.J., assignors to General Instrument Corporation, Newark, N.J., a corporation of New Jersey
Filed Nov. 21, 1962, Ser. No. 239,255
7 Claims. (Cl. 317—234)

The present invention relates to rectifier assemblies, and in particular to the finished product, the method of making same, and a subassembly used in the manufacture thereof.

Rectifier assemblies generally comprise a stud or other mounting element which is adapted to be secured to a panelboard or the like and on which the electrical components are adapted to be mounted. These components include a rectifying unit—the instrumentality which actually produces electrical rectification, together with terminal layers or the like where appropriate—means for making electrical connection to opposite operative ends of the rectifying unit, and means for enclosing and sealing the unit, thereby to protect it from adverse external influences. Two characteristics of these devices are of prime importance insofar as their utility and adaptability are concerned. When they conduct they should have as little electrical resistance as possible, and they should be capable of handling as much electrical power as possible. These two characteristics are in some respects interrelated, since the greater the electrical resistance of the unit, the greater will be the heat developed therein when current passes therethrough, and hence the lower will be its current-carrying capacity.

With the advent of increasingly complex electrical apparatus, the size of the individual circuit components employed has become more and more critical. The space which a given unit takes up on a panelboard or the like is often a matter of great significance to the engineer. It is usually not too difficult to design a device to have a greater current carrying capacity by increasing its size. However, in the rectifier field this is not always feasible because of the rigid dimensional requirements which are applied to devices of that type.

It is a prime object of the present invention to produce a rectifier assembly which, by reason of its novel arrangement of parts, is capable of handling considerably greater power than prior art units of comparable size. It is particularly significant, and it is another prime object of the present invention, that this desirable operational result is obtained by means of a structure which is simpler and less costly, and which may be assembled more readily, than comparable prior art structures, thus leading to the attainment of improved operational results at a lower manufacturing cost.

More specifically, by eliminating certain parts normally present in standard prior art structures, and by redesigning and rearranging the remaining basic parts, an assembly is produced which has less material and fewer joints in the electrical path, thereby reducing electrical resistance, and in which the sealing of the enclosing cap to the remainder of the assembly is accomplished more conveniently and inexpensively than has been possible with prior art constructions, and in a manner which does not tend to cause deterioration of the previously formed joints in the electrical path of the rectifier itself.

In the past the covering cap for the assembly has been sealingly connected to the remainder of the assembly, as by welding, along a flange which extends out radially from the assembly proper for an appreciable distance, electrical connection and mechanical pressure being applied from above and below to and substantially completely around the engaging portions of the assembly flange and the cap in order to cause the welding to take place. This has had the disadvantage from a procedural point of view of making the welding operation relatively troublesome, and from a structural point of view of increasing the overall size of the assembly and making it difficult to gain access to the mounting stud so as to mount the assembly properly on a panelboard or the like. Moreover, in certain very widely used commercial embodiments, the rectifying unit itself has been bonded to a steel piece, and the covering cap is subsequently welded to a peripheral portion of that steel piece. The presence of that steel piece in the electrical circuit of which the rectifying unit is a part adds appreciably to the total effective resistance of the rectifier assembly, both because of the resistance of the steel piece itself and because of the resistance of the joint between that steel piece and the terminal portion of the assembly. The existence of that steel piece therefore reduces the power handling capacity of the assembly, but it has nevertheless been used because of problems involved in sealingly welding the covering cap in place.

In accordance with the present invention the steel piece in the rectifying circuit is completely eliminated. The terminal unit comprises a conductive body mounted on an insulating body. The insulating body is in turn supported on and secured to a mounting stud. The rectifying unit is bonded directly to the conductive body within the peripheral confines of the insulating body. A metal ring, also within the peripheral confines of the insulating body and surrounding and radially spaced from the rectifying unit, is also bonded to the conductive body. The protective cap is provided with a peripheral flange part adapted to rest upon said ring and be welded thereto. The insulating body, together with its supporting metal mounting stud, provides bottom support for the welded parts, welding pressure being applied from above on the peripheral part of the covering cap. During welding electrical connection is made to the welded portion of the cap completely therearound in conventional manner. With respect to the ring on the conductive body, however, electrical connection is made via a plurality of terminal parts preferably formed integrally with the conductive body and extending out therefrom in circumferentially spaced positions. After the welding has taken place all of those terminal parts except one are removed from the assembly, since only a single terminal part is needed to connect the assembly into an appropriate external electrical circuit. The welded joint is sufficiently removed, physically and thermally, from the rectifying unit itself and from the bonded joint between that rectifying uni and the conductive body on which it is mounted, so a not to have any deleterious effect thereon. Since th rectifying unit is bonded directly to the conductive bod) with no steel part interposed therebetween, the effectiv resistance of the rectifier, when it conducts, is minimize( To the accomplishment of the above, and to such othe objects as may hereinafter appear, the present inventic relates to the construction of a rectifier assembly and of subassembly used in the fabrication thereof, and to method of fabrication thereof, all as defined in the a pended claims and as described in this specification, tak together with the accompanying drawing, in which:

Figure 1:
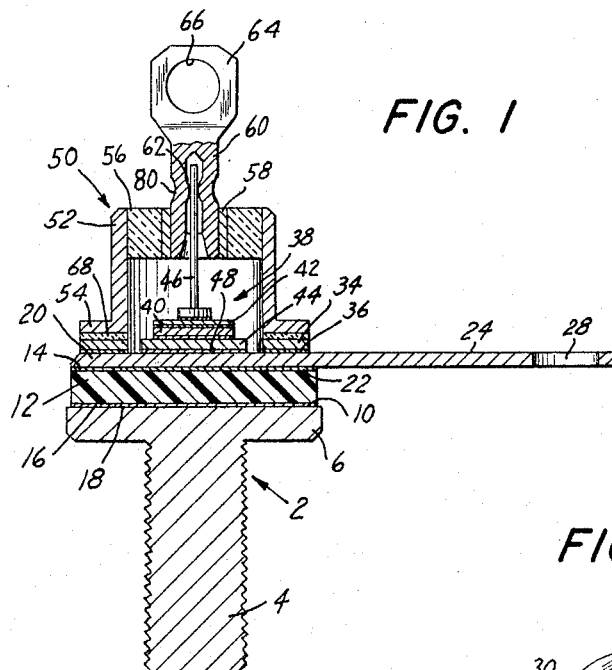
FIG. 1 is a cross sectional view of a preferred embo ment of the present invention.

In the preferred form here specifically disclosed the assembly comprises a metallic mounting stud generally designated 2 formed of some suitable material such as copper and having a threaded shank 4 and an enlarged head 6. The shank 4 is adapted to be passed through a suitable aperture in a panelboard or the like, there to be threadedly engaged in the panelboard aperture or provided with a securing nut received over the stud 4. The periphery of the enlarged head 6 is provided with flats 8 so that it may be grasped and rotated by a wrench when it is being secured in place on external mounting structure.

Positioned on the upper surface 10 of the head 6 is an insulating body 12. This body 12 is preferably of ceramic material, such as alumina, in order to provide both thermal and electrical insulation. Its upper and lower surfaces 14 and 16 are preferably metallized, with the lower surface 16 thereof bonded to the upper surface 10 of the head 6 in any appropriate manner, as by means of the solder layer 18. (The term "solder" as here used comprehends both true solder and braze. The layer 18 is in fact preferably silver braze, and where appropriate the specific type of joint involved will hereinafter be specified, but since it is often a matter of choice as to whether soldering or brazing will be carried out, the terms "soldering" and "solder," as used in this specification and the claims appended thereto, should be construed generically in accordance with the above explanation.) It will be noted that the insulating body 12 is located inside the periphery of the stud head 6, thereby not interfering with external access to the latter.

A conductive body in the form of a copper sheet 20 is positioned on top of the upper surface 14 of the insulating body 12, that upper surface 14 preferably being metallized and the conductive sheet 20 being bonded thereto by the soldering layer 22 (preferably a silver braze). The conductive body 20 is substantially completely inside the periphery of the insulating body 12, except for first and second terminal parts 24 and 26 which extend out therefrom beyond the periphery of the mounting stud head 6. These terminal parts 24 and 26 are preferably formed integrally with the body 20. The first part 24 is provided, adjacent its tip, with an aperture 28 in order to facilitate electrical connection to a lead from an external circuit. Notches 30 and/or scoring 32 are provided at the inner end of the second part 26 adjacent the body proper 20, for a purpose hereinafter to be explained.

A metal ring 34 is positioned on the conductive body 20 inside the periphery therof. The ring 34 is formed of appropriate weldable material such as steel, preferably nickel-plated. It is bonded to the conductive body 20 by the soldering layer 36, preferably a silver braze.

Figure 2:
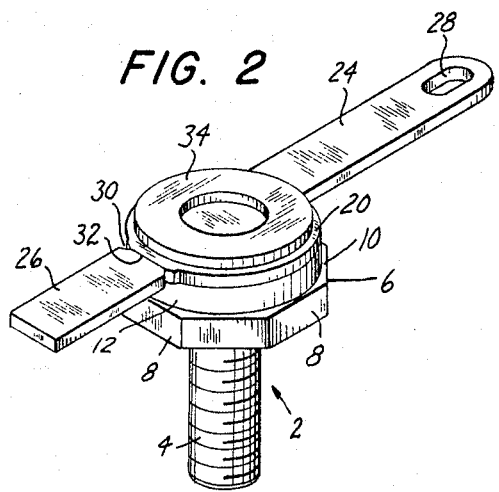
FIG. 2 is a three-quarter perspective view of a s assembly used therein and comprising the assembly FIG. 1 before the rectifying unit and the protective ( have been secured in place.

The subassembly as thus described is illustrated in FIG. 2. The various parts thereof are preferably assembled in a single operation, the parts being appropriately positioned with brazing material in the joints as indicated, all of the joints being brazed in a single operation.

Next the rectifying unit proper, generally designated 38, is put into place. As here specifically disclosed that unit comprises a silicon rectifier junction body 40 sandwiched between molybdenum wafers 42 and 44 soldered (by soft solder) to the upper and lower surfaces respectively of the silicon body 40. It will be understood, however, that the specific construction and arrangement of the rectifying unit 38 can be varied widely, as is well known in the art. An upstanding lead 46 is soldered (by soft solder) to the upper surface of the upper molybdenum wafer 42, as is conventional. The rectifying unit 38 is positioned on the central portion of the conductive unit 20 inside the ring 34 and radially inwardly spaced from that ring, and is bonded to the conductive body 20, so as to be physically and electrically connected thereto, by soldering layer 48 (preferably a hard solder). The subassembly as thus constituted is illustrated in FIG. 3.

The rectifying unit 38 is adapted to be covered and sealed by a cap generally designated 50. This cap comprises a tubular steel body 52 having at its lower end a peripheral flange 54 of substantially the same size and configuration as the ring 34. A washer 56 of glass or other insulating material is sealingly secured to the inner surface of the metal ring 52 and has a metal ring 58 sealingly secured to its inner periphery. A conductive terminal lug 60 is secured by soldering (preferably a silver blaze) to the ring 58 and is provided with a blind aperture 62 and an external lug portion 64 having an aperture 66 to facilitate electrical connection to external circuitry. When the cap 50 is pressed in position with its flange part 54 over the ring 34, the upwardly extending lead 46 of the rectifying unit 38 passes into the blind aperture 62 and extends therethrough to a point above the upper surface of the ring 52 and washer 56. A layer 68 of suitable welding material or flux is interposed between the facing surfaces of the cap flange 54 and the ring 34.

Figure 3:
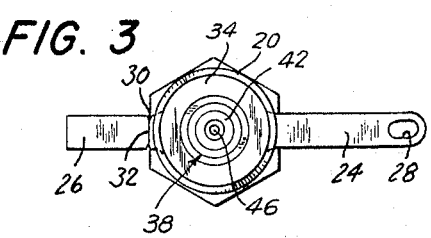
FIG. 3 is a top plan view of the assembly of FIG. 2, but showing the rectifying unit in place.
Figure 4:
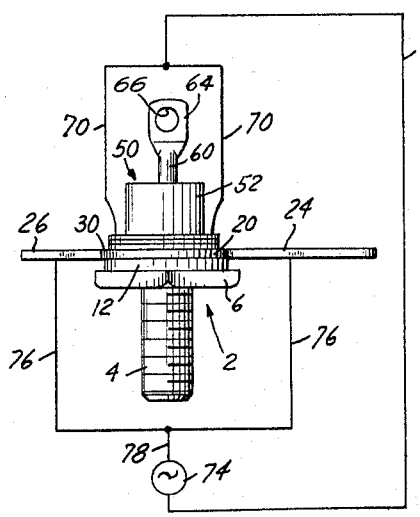
FIG. 4 is a side elevational view of the assembly of the present invention as it appears when the covering cap is being welded to the remainder of the assembly, the drawing showing schematically the manner in which the welding electrical connections are made.

Next the cap 50 is welded to the subassembly of FIG. 3. This welding operation is accomplished by pressing the cap flange 54 downwardly against the ring 34 by means of a suitable fixture to which electrical connection is made, as by leads 70 and 72 extending from one side of the welding current source 74 (see FIG. 4). Preferably electrical connection is made to the flange 74 completely therearound. The downward pressure on the cap flange 54 is resisted and supported by the stud head 6 and the insulating body 12 as well as by the conductive body 20, at least the elements 6 and 12 having sufficient strength and rigidity to provide proper support and resistance. Electrical connection is made to the ring 34 via the conductive body 20 and the terminal parts 24 and 26 thereof, the latter being connected by leads 76 and 78 to the other side of the welding power source 74. If only a single terminal part 24 or 26 were utilized, the current distribution in the ring 34 during the welding operation would be such that a uniform and effective weld between the parts 34 and 54 could not reliably be achieved around the complete periphery of the assembly. However, by using a plurality of terminal parts 24 and 26 which are circumferentially spread relative to one another, and specifically by using a pair of such terminal parts 24 and 26 which are diametrically opposed to one another, a proper and effective welding current distribution is achieved. More than two terminal parts could be used, of course, if desired, but we have found that two such parts, as shown, give highly satisfactory results on a production basis.

After the cap 50 has been welded in place, the terminal part 60 is crimped, at 80, so as to engage and make firm electrical connection with the lead 46.

Thereafter the second terminal part 26 is removed from the assembly, since it is needed only for the welding operation, and the assembly is complete and ready for use. The notches 30 and/or scoring 32 previously described permit the ready removal of the second terminal part 26 merely by bending it along the line defined by the notches 30 and/or scoring 32 and breaking it off from the conductive body 20 along that line.

The rectifying unit 38 is bonded directly, by the layer 48, to the conductive body 20 which is integral with the first terminal part 24. Hence the effective resistance of the rectifier, when it is connected in an external circuit and is conductive, is minimized. As a result the heat produced therein by current passing therethrough is minimized, and its power handling capacity is maximized. It has been found that units made in accordance with the present invention can handle approximately from 20 to 30% more power than comparable commercial prior art units of the same size.

Moreover, the arrangement of parts is such that the assembly takes up but a minimal amount of space and in particular, except for the terminal part 24, does not extend out laterally beyond the head 6 of the mounting stud. The stud head 6, it will be noted, is exposed for ready grasping and manipulation when the assembly is being fastened to a mounting board or other external support.

In addition, the arrangement of parts is such that the welding operation which secures the cap 50 to the remainder of the assembly can be carried out in an extremely convenient manner and without having to use special equipment. The mounting stud 2 and the insulating body 12 themselves provide structural support for the parts 34 and 54 while the latter are being welded, and it is not necessary to use an external fixture to provide such support or to make electrical connection with the ring 34 completely around its periphery. Moreover, the heat developed during the welding operation is sufficiently removed from the soldering joint 48 which connects the rectifying unit 38 to the conductive body 20 so as not to adversely affect that joint.

As a result an assembly of improved electrical characteristics has been devised and is here disclosed in a preferred form, which assembly may be fabricated more reliably, conveniently and inexpensively than comparable prior art constructions.

While but a single specific embodiment of the present invention has been here disclosed, it will be apparent that many variations may be made, all within the scope of the instant invention as defined in the following claims.

We claim:

1. A rectifier assembly comprising an insulating body, a conductive body on and solder-secured to said insulating body, having at least a portion inside the periphery of said insulating body, and having a terminal part extending from said portion to a point laterally beyond said insulating body, a rectifying unit solder-secured to said portion of said conductive body and in electrically conductive relation therewith, said rectifying unit being located inside the periphery of said insulating body, a metal ring surrounding and radially spaced from said rectifying unit, said ring being mounted on and solder-secured to said conductive body and having a portion inside the periphery of said insulating body, and a cap covering said rectifying unit and having a peripheral part resting on and weld-secured to said portion of said ring.

2. A rectifier assembly comprising a metal mounting stud with an enlarged head, an insulating body resting on, secured to, and substantially completely inside the periphery of said head, a conductive body on and secured to said insulating body, having at least a portion inside the periphery of said insulating body, and having a terminal part extending from said portion to a point laterally beyond said insulating body, a rectifying unit secured to said portion of said conductive body and in electrically conductive relation therewith, said rectifying unit being located inside the periphery of said insulating body, a metal ring surrounding and radially spaced from said rectifying unit, said ring being mounted on and electrically conductively secured to said conductive body and having a portion inside the periphery of said insulating body, and a cap covering said rectifying unit and having a peripheral part resting on and weld-secured to said portion of said ring.

3. A subassembly for use in the manufacture of a rectifier assembly, said subassembly comprising an insulating body, a conductive body on and secured to said insulating body, having at least a portion thereof inside the periphery of said insulating body, and having circumferentially separated terminal parts extending from said portion to points laterally beyond said insulating body, a rectifying unit secured to said portion of said conductive body and in electrically conductive relation therewith, and a metal ring surrounding and radially spaced from said rectifying unit, on and electrically conductively secured to said portion of said conductive body, and having a portion inside the periphery of said support, and means on said conductive body between said portion thereof and some of said terminal parts for facilitating the removal of said some of said terminal parts from said portion of said conductive body.

4. A subassembly for use in the manufacture of a rectifier assembly, said subassembly comprising an insulating body, a conductive body on and secured to said insulating body, having at least a portion thereof inside the periphery of said insulating body, and having circumferentially substantially diametrically separated terminal parts extending from said portion to points laterally beyond said insulating body, a rectifying unit secured to said portion of said conductive body and in electrically conductive relation therewith, and a metal ring surrounding and radially spaced from said rectifying unit, on and electrically conductively secured to said portion of said conductive body, and having a portion inside the periphery of said support, and means on said conductive body between said portion thereof and some of said terminal parts for facilitating the removal of said some of said terminal parts from said portion of said conductive body.

5. The method of assembling a rectifying assembly which comprises positioning a conductive body on an insulating body so that at least a portion of said conductive body is inside the periphery of said insulating body and soldering said conductive body to said insulating body in that position, said conductive body having a plurality of terminal parts extending therefrom laterally beyond said insulating body, soldering a metal ring to said conductive body, said ring having a portion substantially inside the periphery of said insulating body, soldering a rectifier unit to and in electrically conductive relation with said portion of said conductive body and inside and radially spaced from said ring, placing a cap over said rectifier unit with a peripheral part of said cap resting on said portion of said ring, making electrical connection to said peripheral cap portion, making electrical connection to said ring via said plurality of terminal parts, and welding said peripheral cap part to said ring portion by electricity supplied through said electrical connections.

6. The method of assembling a rectifying assembly which comprises positioning a conductive body on an insulating body so that at least a portion of said conductive body is inside the periphery of said insulating body and soldering said conductive body to said insulating body in that position, said conductive body having a plurality of terminal parts extending therefrom laterally beyond said insulating body, soldering a metal ring to said conductive body, said ring having a portion substantially inside the periphery of said insulating body, soldering a rectifier unit to and in electrically conductive relation with said portion of said conductive body and inside and radially spaced from said ring, placing a cap over said rectifier unit with a peripheral part of said cap resting on said portion of said ring, making electrical connection to said peripheral cap portion, making electrical connection to said ring via said plurality of terminal parts, welding said peripheral cap part to said ring portion by electricity supplied through said electrical connections, and then removing some but not all of said terminal parts from said conductive body.

7. The method of assembling a rectifying assembly which comprises positioning a conductive body on an insulating body so that at least a portion of said conductive body is inside the periphery of said insulating body and soldering said conductive body to said insulating body in that position, said conductive body having a plurality of terminal parts extending therefrom laterally beyond said insulating body, soldering a metal ring to said conductive body, said ring having a portion substantially inside the periphery of said insulating body, soldering a rectifier unit to and in electrically conductive relation with said portion of said conductive body and inside and radially spaced from said ring, placing a cap over said rectifier unit with a peripheral flange part of said cap resting on said portion of said ring, making electrical connection to said peripheral cap portion, making electrical connection to said ring via said plurality of terminal parts, and welding said peripheral cap part to said ring portion by electricity supplied through said electrical connections while physically supporting said peripheral cap part and said ring portion by said insulating body.

References Cited by the Examiner
UNITED STATES PATENTS

| | | | |
|---|---|---|---|
| 2,817,048 | 12/1957 | Thuermel | 317—234 |
| 2,967,984 | 1/1961 | Jamison | 317—234 |
| 3,072,832 | 1/1963 | Kilby | 317—235 |
| 3,153,275 | 10/1964 | Ackerman | 29—25.3 |

JOHN W. HUCKERT, *Primary Examiner.*

M. EDLOW, *Assistant Examiner.*